United States Patent
Arndt et al.

(10) Patent No.: US 7,763,367 B2
(45) Date of Patent: Jul. 27, 2010

(54) COMPONENT WITH A CERAMIC COATING, INTO WHICH PARTICLES ARE EMBEDDED, AND METHOD FOR PRODUCING SAID COMPONENT

(75) Inventors: Frank Arndt, Berlin (DE); Jens Dahl Jensen, Berlin (DE); Ursus Krüger, Berlin (DE); Daniel Körtvelyessy, Berlin (DE); Gabriele Winkler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/215,600

(22) Filed: Jun. 26, 2008

(65) Prior Publication Data

US 2009/0005233 A1    Jan. 1, 2009

(30) Foreign Application Priority Data

Jun. 28, 2007   (DE)   ........................ 10 2007 030 602

(51) Int. Cl.
*B32B 9/00*   (2006.01)
(52) U.S. Cl. ................... 428/702; 428/323; 428/329
(58) Field of Classification Search ................. 428/323, 428/329, 702
See application file for complete search history.

(56) References Cited

U.S. PATENT DOCUMENTS

| | | | |
|---|---|---|---|
| 5,305,726 A | 4/1994 | Scharman et al. | |
| 7,041,980 B2 * | 5/2006 | Schuller et al. | 250/361 R |
| 2003/0008764 A1 | 1/2003 | Wang et al. | |
| 2004/0146741 A1 | 7/2004 | Birkner et al. | |
| 2007/0056465 A1 | 3/2007 | Dutta | |
| 2007/0104969 A1 * | 5/2007 | Nagaraj et al. | 428/469 |
| 2007/0128447 A1 | 6/2007 | Hazel et al. | |

FOREIGN PATENT DOCUMENTS

| | | |
|---|---|---|
| DE | 10 2005 047 739 B3 | 2/2007 |
| EP | 0 663 020 B1 | 8/1997 |
| EP | 0 905 279 A1 | 3/1999 |
| EP | 0 995 816 A1 | 4/2000 |
| EP | 1 096 040 A2 | 5/2001 |
| EP | 0 933 446 B1 | 4/2003 |
| EP | 1 362 933 A1 | 11/2003 |
| EP | 1 793 015 A2 | 6/2007 |
| WO | WO 2006037702 A | 4/2006 |

OTHER PUBLICATIONS

Tang F et al. Effects of variations in coating materials and process conditions on the thermal cycle properties of NiCrAlY/YSZ thermal barrier coatings Materials science and engineering a: structural materials: properties, microstructure & processing Bd. 425, Nr. 1-2 Jun. 15, 2006 Seiten 94-106 SP005481113 ISSN: 0921-5093; Others.

* cited by examiner

*Primary Examiner*—Gwendolyn Blackwell

(57) ABSTRACT

The subject matter of the invention is a component which is provided with a ceramic coating forming the surface. Inventively there is provision at least in a cover layer of the coating for nanoparticles made from a colorant (CrCoAl or a spinel-type oxide) and aluminum oxide nanoparticles. This combination of nanoparticles in the coating advantageously results in a resistance to high temperatures of the coloring of the surface of up to 1000° C. not previously known. This allows even components under great stress, such as for example compressor or turbine blades of a gas turbine, to be provided with temperature-resistant coloring. This can then be used for an optical inspection for example. Protection is also claimed for a method for creating the inventive coating.

6 Claims, 1 Drawing Sheet

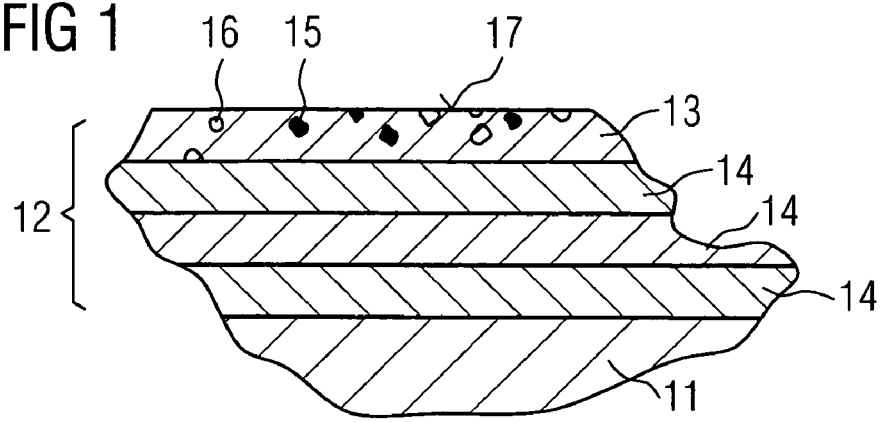
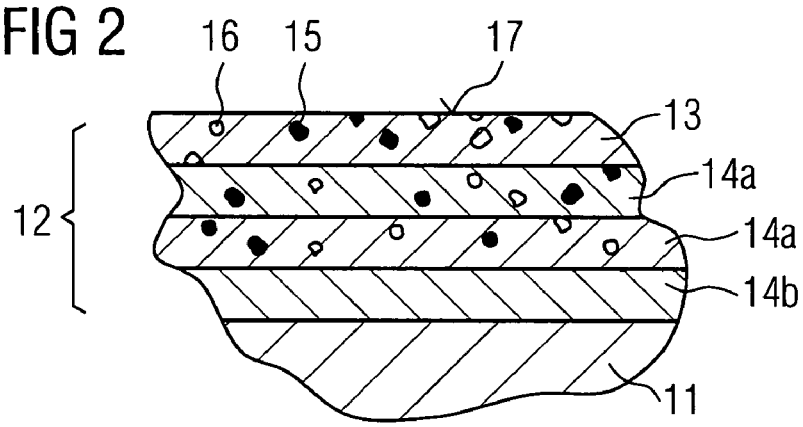
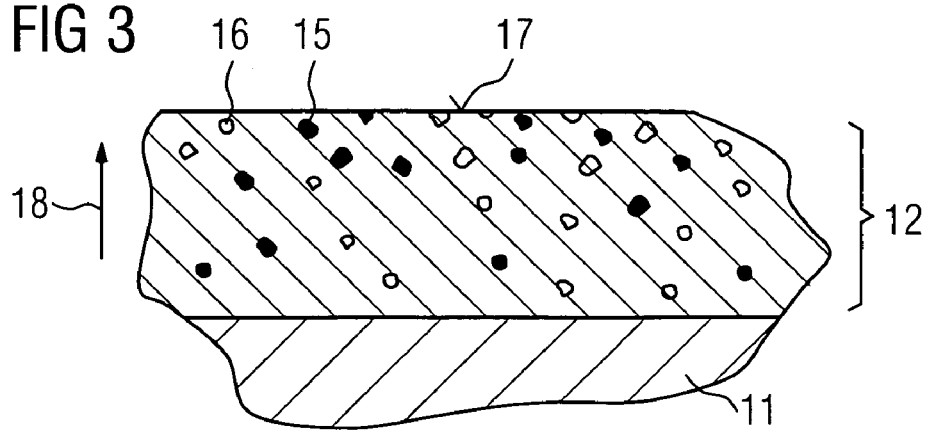

COMPONENT WITH A CERAMIC COATING, INTO WHICH PARTICLES ARE EMBEDDED, AND METHOD FOR PRODUCING SAID COMPONENT

CROSS REFERENCE TO RELATED APPLICATIONS

This application claims the benefits of German application No. 10 2007 030 602.6 filed Jun. 28, 2007 and is incorporated by reference herein in its entirety.

FIELD OF INVENTION

The invention relates to a component with a ceramic coating forming its surface, with particles being embedded into the coating.

BACKGROUND OF THE INVENTION

Such coatings are described in EP 1 096 040 A2, EP 905 279 A1, EP 995 816 636 A1 and EP 933 446 B1. In the last-named document in particular it is stated that the coating can be mixed with additives in the form of particles which guarantees the function of corrosion inhibitors, dry lubricants, color pigments or a combination of these functions.

When the coatings are produced these particles are subjected to a dispersion which forms a coating substance. This coating substance is applied to the substrate to be coated which is subsequently subjected to heat treatment, in order to achieve hardening of the coating. In this case a chemical conversion of the elements contained in the dispersion occurs simultaneously, which contributes to the formation of the ceramic framework of the coating.

Especially for the color pigments which are employed it has been shown that these are subject to a chemical change during the heat hardening or during subsequent thermal stress on the component, which also leads to a change in the optical appearance of the surface. This takes the form of the color of the surface changing during ongoing operation of the component. Such observations can typically be made during operation of thermally highly-stressed turbine blades or compressor blades of a gas turbine.

SUMMARY OF INVENTION

The object of the invention consists of specifying a component with a ceramic coating or which is mixed with coloring particles, which has a comparatively high temperature resistance to changes in the color.

This object is achieved with the inventive component specified at the start by the deposited particles being nanoparticles, with on the one hand aluminum oxide nanoparticles being provided and on the other hand colorant nanoparticles being provided, with the latter also consisting of CrCoAl oxide or a compound of the spinel type and with at least one part of the colorant nanoparticles being exposed on the surface. It has in fact surprisingly been shown that the specified substances, which are already comparatively resistant to high temperatures per se, will be stabilized by an addition of aluminum oxide nanoparticles so that the colorant nanoparticles survive not only the heat treatment necessary for the creation of the coating without changing color but also survive thermal stresses arising over longer periods of operation. The production-related heat treatment for formation of the coating is typically at a temperature of around 400° C. If for example the inventive coatings are used as protective layers of compressor blades and turbine blades of a gas turbine, temperatures of up to 800 to 1000° C. can occur, with the trials having shown that even with these stresses the coloring of the surface remains stable.

A further advantageous side-effect of using aluminum oxide nanoparticles lies in the fact that the resistance to changes in temperature of the coatings is also improved. This means that the formation of stress fractures even when the layers cool down rapidly is avoided.

The following general sum formulae as well as concrete examples can be specified for the spinel-type colorant nanoparticles employed:

$M^{2+}M_2^{3+}O_4$: $MgAl_2O_4$, $MnAl_2O_4$, $MnMn_2O_4$, $FeAl_2O_4$, $FeCr_2O_4$, $CoAl_2O_4$, $CoCo_2O_4$, $NiAl_2O_4$, $ZnAl_2O_4$, $FeFe_2O_4$, $CoFe_2O_4$, $NiFe_2O_4$, $MgFe_2O_4$, $MgGa_2O_4$, $MgIn_2O_4$;

$M^{4+}M^2{}_{2+}O_4$:

$TiMg_2O_4$, $TiFe_2O_4$, $TiZn_2O_4$, $SnZn_2O_4$, $SnCo_2O_4$, $M^{6+}M_2{}^{4+}O_4$:

$NA_2MoO_4$, $Ag_2MoO_4$

In accordance with one embodiment of the invention there is provision for the coating to comprise a number of internal layers, with at least the colorant nanoparticles only been provided in the cover layer forming the surface or in the cover layer forming the surface and in layers adjoining this layer, but not in all layers. The basis for this embodiment of the invention is that a coloring only produces an optical effect in the areas close to the surface of the coating. In concrete terms the colorant nanoparticles must form a part of the surface so that their optical properties of absorption of specific light wavelengths are exploited.

However it can be sensible to also provide layers below the cover layers with colorant nanoparticles. The background to this is that the coating is subjected to a certain amount of wear so that it can occur that during the component's operating life the first layer of the coating is completely worn away. This advantageously allows a color indicator to be implemented to indicate ongoing coating wear. If the color nanoparticles of the first layer or of the first layer and of other subsequent layers are completely worn away, the component loses its typical color. Since the coloring is temperature-stable per-se, a change in the color must in any event be attributed to an ongoing wear and not to a falsification of the coloring by the color pigments.

In an alternate embodiment there is provision for the coating to be embodied as a gradient coating, with at least the color nanoparticles being distributed in a concentration which reduces as the distance from the surface in the coating increases. This takes account in a similar manner of the situation in which the color nanoparticles are only effective on the surface of the coating, as has already been explained for multi-layer coating construction. A wear indicator by inspection of the coloring of the coating can also be implemented if the coating is embodied as a gradient coating. In this case the color intensity of the coating decreases with ongoing wear as the surface of the coating is worn away, since the concentration of coloring nanoparticles responsible for the coloring reduces constantly.

The invention further relates to a method for creating a ceramic coating on a component, in which a coating substance, consisting of a solvent, the dissolved precursors of a ceramic and dispersed particles, is applied to the component. Subsequently the component provided with the coating substance is subjected to heat treatment in which the solvents are evaporated and the precursors of the ceramic are converted while embedding the particles into the ceramic coating, with the particles influencing the color of the surface of the coating.

Such a method has already been explained above on the basis of the patent documents cited there. Using this as its starting point, a further object of the invention emerges by specifying a method of the above type for producing a ceramic coating with which ceramic coatings can be created with a comparatively temperature-stable coloration.

This object is achieved with the said inventive method by nanoparticles being used as the particles. with on the one hand aluminum oxide nanoparticles being dispersed and on the other hand color nanoparticles being dispersed, with the latter consisting of CrCoAl oxide or of a spinel-type compound and with at least one part of the colorant nanoparticles being exposed on the surface.

The coated component produced using the inventive method has the advantages stated at the start. These consist especially of their resistance to high temperatures of the coloring of the surface, with said temperatures able to be as high as 1000° C., and are thus able to allow a temperature-stable coloration of components under stress from high temperatures, such as compressor or turbine blades of a gas turbine for example.

The coating substance used in the method consists of a dispersion. As well as the aluminum oxide nanoparticles and color nanoparticles, other particles can also be included in this dispersion, which improve the corrosion protection characteristics of the coating for example.

The substances listed in the said prior art, especially acids containing phosphor, chromate, molybdenum or tungsten, are suitable as dispersion media. The coating substance can also contain the ceramic to be created as chemical components of the dispersion medium or precursors dissolved in this. These are transferred into the ceramic coating matrix by the heat treatment.

In accordance with an embodiment of the method there is provision for the nanoparticles to be added with a proportion of at least 5 to at most 40% by weight into the coating substance. The percentages given in this application are to be understood as mass percent figures even if more precise figures are not given. The use of nanoparticles advantageously allows the achievable concentration of particles in the dispersion to be increased, so that the functionality of the coating to be formed can be influenced more strongly by the added nanoparticles. The dispersions produced are advantageously also more stable.

The coating substance can be gaseous, liquid or in the form of a paste, depending on the desired type of processing. Depending on the viscosity of the coating substance, different methods for applying the coating substance to the substrate can be employed. Methods in include spraying, spattering, spreading, dipping, impelling or polishing.

An especial embodiment of the invention is obtained if the ratio by mass of aluminum oxide nanoparticles to colorant nanoparticles lies between 1:3 and 3:1. It has been shown that in these situations the ratio of the described effects of a characteristic coloring of the surface by the colorant nanoparticles and a temperature stabilizing effect by the aluminum oxide nanoparticles is the most balanced.

BRIEF DESCRIPTION OF THE DRAWINGS

Further details of the invention are described below with reference to the drawing. The same or corresponding drawing elements are shown in the figures in each case by the same reference symbol and are only explained a number of times where differences emerge between the individual figures. The figures show FIGS. 1 and 2 schematic cross-sections of exemplary embodiments of the inventive coating, which are embodied as a multilayer coating, and FIG. 3 an exemplary embodiment of the inventive coating which is designed as a gradient coating.

DETAILED DESCRIPTION OF INVENTION

A component 11 in accordance with FIG. 1 features a coating 12 which consists of a cover layer 13 and further layers 14. Incorporated into the cover layer are colorant nanoparticles 15 and aluminum oxide nanoparticles 16 which are exposed on a surface 17 of the component, i.e. on the surface 17 formed by the cover layer 13. The subsequent layers do not have any of the said nanoparticles.

Nanoparticles are understood as particles with a size of below one micrometer—preferably of less than 100 nanometers. The colorant nanoparticles each consist of one of the specified spinel compounds. To create the surface color by a color mixture, color nanoparticles of different composition must be mixed together in each case, with however each color nanoparticle merely featuring one type of compound. This naturally also applies to the colorant nanoparticles made of CrCoAl oxide, which does not represent a spinel-type oxide per se.

The component depicted in FIG. 2 only differs from that depicted in FIG. 1 in that colorant nanoparticles 15 and aluminum nanoparticles 16 are additionally provided in the two layers 14a after the cover layer 13. Only the last layer 14b located on the component 11 does not feature these nanoparticles.

The coating 12 could be a corrosion-protection coating, with its corrosion-protection effect being retained after the coating has been removed by wear until the thickness of layer 14b is reached. A coloring of the surface 17 is thus also preserved even when layers 13 and 14a are removed. Only when wearing away of the coating has advanced so far that layer 14b is reached does the color of the surface change, which can be interpreted as an indicator that the component needs to be replaced or that the coating needs to be renewed.

The coating 12 depicted in FIG. 3 is a gradient coating. This means that the concentration C of aluminum oxide nanoparticles 16 and color nanoparticles 15 increases towards the surface 17 (indicated by an arrow 18). In this exemplary embodiment a removal of the coating as a result of wear leads to a successive reduction of the color intensity of the surface, so that this parameter can also be evaluated as an indicator for the progress of wear in the coating.

The aluminum oxide nanoparticles have the composition $Al_2O_3$. A method for creating the coatings will be given below as an example.

The table shows colorant combinations which are investigated for their suitability and each deliver good results. It has been shown that especially with the colorant combinations 5, 7 and 9 a high color intensity of the surface and processability in relation to sprayability of the coating substance can be achieved.

| | Respective proportion in the coating substance in % by weight the remainder is water in each case | | | |
|---|---|---|---|---|
| No. of color combination | CrCoAl oxide | Cr(III) phosphate | Al oxide | Phosphoric acid |
| 1 | 0.6 | 0.6 | 10 | 10 |
| 2 | 0.6 | 0.9 | 17.5 | 17.5 |
| 3 | 0.6 | 1.2 | 25 | 25 |

-continued

| No. of color combination | CrCoAl oxide | Cr(III) phosphate | Al oxide | Phosphoric acid |
|---|---|---|---|---|
| 4 | 0.9 | 0.6 | 17.5 | 25 |
| 5 | 0.9 | 0.9 | 25 | 10 |
| 6 | 0.9 | 1.2 | 10 | 17.5 |
| 7 | 1.2 | 0.6 | 25 | 17.5 |
| 8 | 1.2 | 0.9 | 10 | 25 |
| 9 | 1.2 | 1.2 | 17.5 | 10 |

Respective proportion in the coating substance in % by weight the remainder is water in each case

The invention claimed is:

1. A component with a ceramic coating, the ceramic coating comprising an outer surface and particles which influence a surface color being embedded in the coating, comprising:
a plurality of discrete aluminum oxide nanoparticles embedded in the coating; and
a plurality of discrete colorant nanoparticles embedded in the coating, wherein colorant nanoparticles comprises of at least one of CrCoAl oxide particles and spinel-type compound particles, at least a portion of the plurality of the colorant nanoparticles are exposed on the outer surface of the coating, and the colorant nanoparticles are effective to produce an optical effect different than that produced by a coating without colorant nanoparticles.

2. The component as claimed in claim 1, wherein the coating features a plurality of layers, with at least the colorant nanoparticles only being provided in a cover layer forming the surface or in the cover layer forming the surface and in subsequent layers, but not in a layer adjacent to the substrate.

3. The component as claimed in claim 2, wherein the coating is designed as a gradient coating, with at least the colorant nanoparticles being distributed in the coating in a concentration which reduces as the distance to the surface increases.

4. The component as claimed claim 3, wherein the component is able to withstand high thermal stress.

5. The component as claimed claim 4, wherein the component is a turbine blade or a compressor blade of a gas turbine.

6. A component with a ceramic coating, the ceramic coating comprising an outer surface and particles which influence a surface color being embedded in the coating, comprising:
a plurality of discrete aluminum oxide nanoparticles embedded in the coating; and
a plurality of discrete colorant nanoparticles embedded in the coating, wherein colorant nanoparticles comprise spinel-type compound particles, and at least a portion of the plurality of the colorant nanoparticles are exposed on the outer surface of the coating, and the colorant nanoparticles are effective to produce an optical effect different than that produced by a coating without colorant nanoparticles.

* * * * *